May 7, 1935.  J. W. LEIGHTON  2,000,180
INDIVIDUAL WHEEL SUPPORT FOR MOTOR VEHICLES
Filed July 19, 1933   2 Sheets-Sheet 1
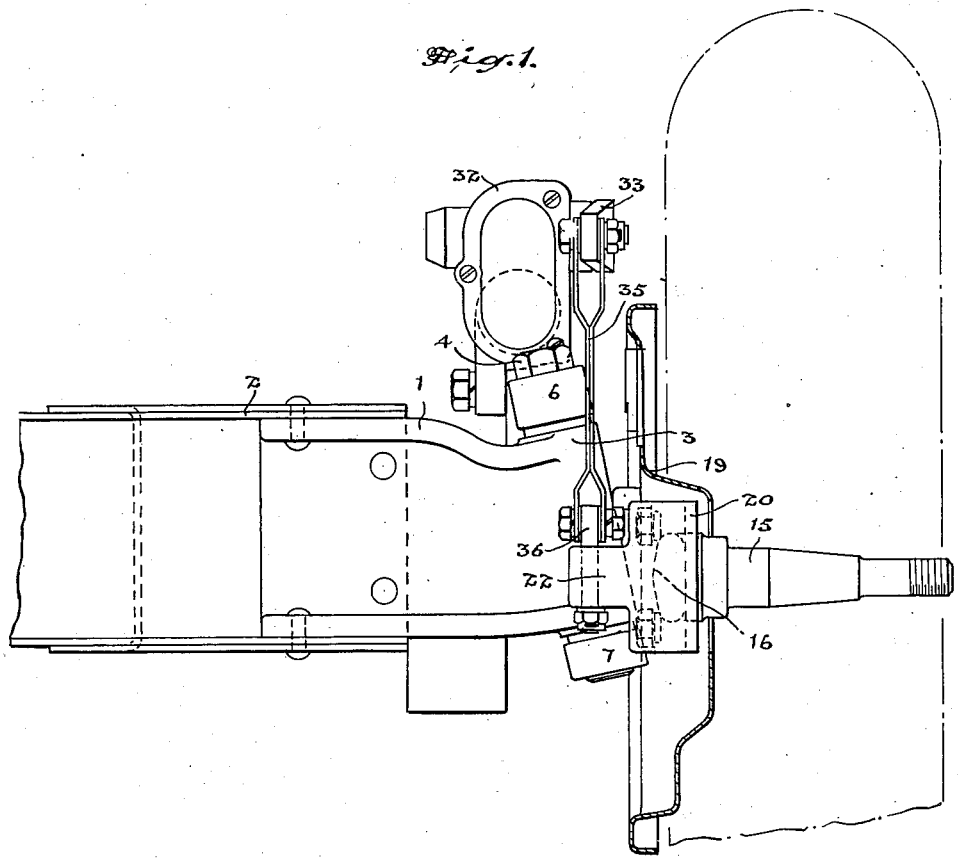
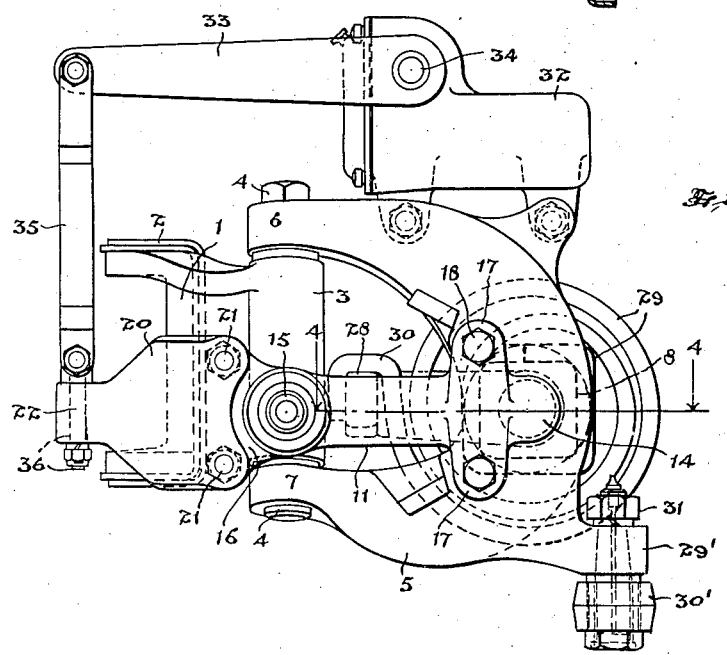
Inventor:
John Wycliffe Leighton May 7, 1935. J. W. LEIGHTON 2,000,180
INDIVIDUAL WHEEL SUPPORT FOR MOTOR VEHICLES
Filed July 19, 1933 2 Sheets-Sheet 2

Inventor.
John Wycliffe Leighton.

Patented May 7, 1935

2,000,180

UNITED STATES PATENT OFFICE 2,000,180

INDIVIDUAL WHEEL SUPPORT FOR MOTOR VEHICLES

John Wycliffe Leighton, Port Huron, Mich.

Application July 19, 1933, Serial No. 681,084

8 Claims. (Cl. 267—20)

The principal objects of the invention are to reduce to the minimum the unsprung weight in motor vehicles thereby reducing undesirable and destructive vibrations, and further to devise a construction which will be operable with the ordinary types of steering gear.

A further and important object is to devise a structure which may be manufactured at low cost and will be easily and quickly assembled on the vehicle structure.

A still further object is to provide a structure which will form a compact individual unit permitting bench assembly of practically the entire device ready for attachment to the vehicle frame.

The principal feature of the invention consists in the novel construction and arrangement of a cranked member carrying the wheel axle mounted to swing in a vertical plane on a horizontal axis carried by a laterally swingable member pivoted on a king pin rigidly supported from the vehicle frame, the crank member being spring held to a normal horizontal position.

A further feature of importance consists in the arrangement of a shock absorbing device between the vertically swinging axle carrying member and the horizontally swinging member.

In the accompanying drawings Figure 1 is a front elevational view of the individual wheel support unit.

Figure 2 is a side elevational view of the unit.

Figure 3:
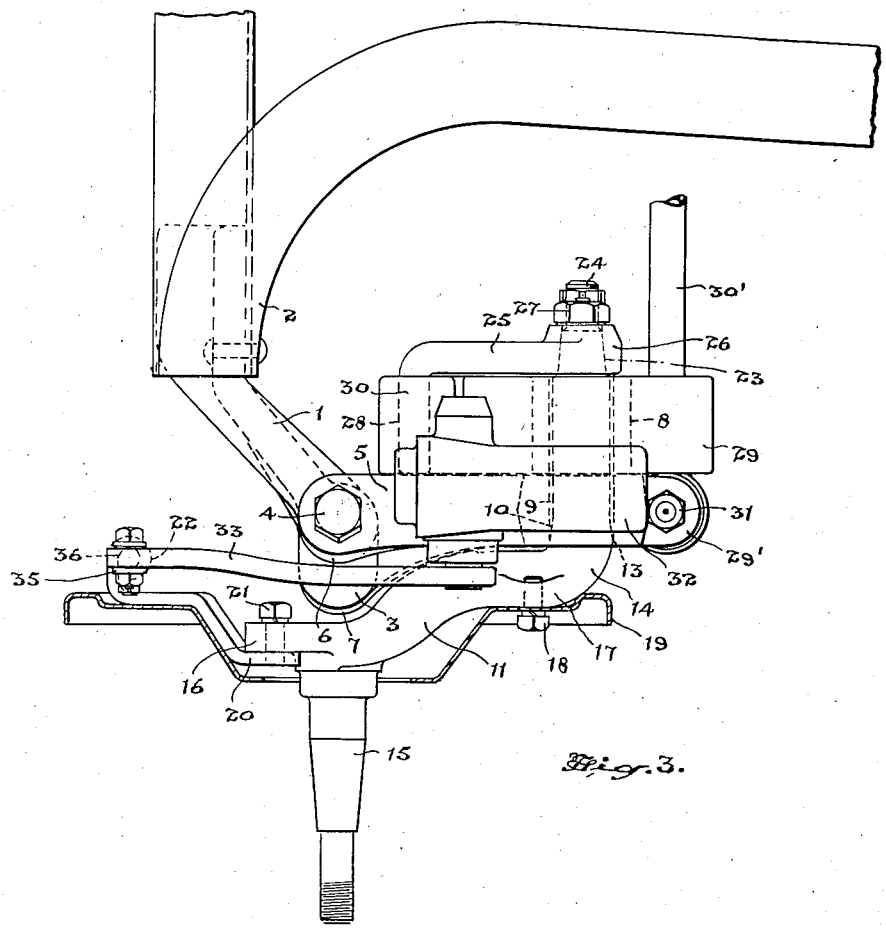
Figure 3 is a plan view of the unit.
Figure 4:
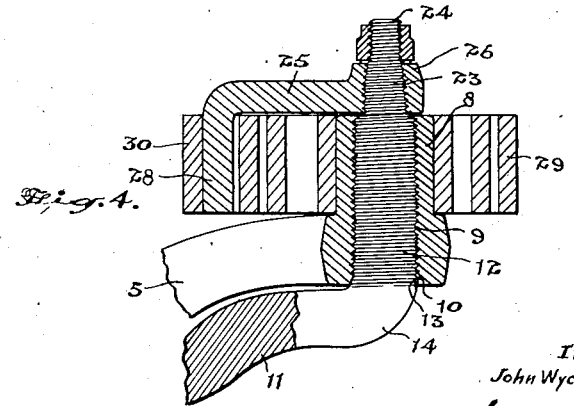
Figure 4 is a horizontal plan section on the line 4—4 of Figure 2.

In the development of automotive vehicles it has been considered highly desirable to reduce the unsprung weights, particularly those embodied in the axle structures and many different forms of mechanisms for individual wheel supports have been proposed.

In the present invention as illustrated in the accompanying drawings a bracket 1 rigidly secured to the vehicle frame 2 extends laterally therefrom and has formed on its outer end an upright boss 3 in which a suitable king pin 4 is mounted. A C-shaped yoke member 5, which may be cast or forged, spans the boss 3 and the extremities 6 and 7 thereof are mounted on the king pin so that the yoke swings freely laterally toward and from the vehicle frame.

A boss 8 is formed on the inward side of the yoke 5 and the perimeter thereof is preferably square.

A threaded bearing orifice 9 is provided in the yoke member extending through the boss 8, the top of the thread being preferably flared outwardly at the outer end 10.

A crank arm 11 is formed with a threaded bearing portion 12 engaging the threads of the orifice 9 and the thread root 13 adjacent to the elbow 14 is flared outwardly to fit the flared thread of the bearing orifice so that there will be no sudden decrease of cross section in the crank member and a consequent transverse fracture line. The outer portion of the arm 11 is provided with an axle stud 15, preferably forming an integral part thereof and a vertically disposed flange 16 is formed at the extremity of said arm. A pair of lugs 17 are formed on the outer side of the arm 11 adjacent to the elbow and said lugs are provided with threaded holes to receive the bolts 18 to secure the brake drum disc 19. An inwardly offset bracket 20 is secured by bolts 21 to the flange 16. This bracket is formed with a vertically disposed eye end 22.

The inward end of the threaded bearing end of the crank arm 11 is formed with a reduced tapered portion 23 and a threaded entremity 24. An arm 25 having a tapered socket end 26 is mounted on the portion 23 and secured in adjusted positions by the nut 27.

The free end 28 of the arm 25 is bent at right angles to extend into the plane of the squared end of the boss 8.

A spirally coiled spring 29 is formed square at its inner end to snugly embrace the squared boss 8 and the outer end of said spring is formed with a hook portion 30 to engage the right angularly bent end 28 of the arm 25. The arm 25 is adjusted to apply the desired tension to the spring to support the vehicle load with the crank arm 11 in a substantially horizontal position. It will be understood that the arm 25 may be adjusted in accordance with the vehicle load.

The yoke member 5 is provided with a lug 29' to which the tie rod 30' is pivotally connected by the bolt 31, said tie rod extending across the vehicle and being connected to the yoke member on the opposite side. The steering bar or drag link will also be connected to one of these lugs though this connection is not shown.

A shock absorber member 32 of any suitable design is mounted on the upper side of the yoke 5 and an arm 33 extends forwardly from the shaft 34 and is connected by a tie bar 35 to a bolt 36 secured in the eye end 22 of the bracket 20 mounted on the crank arm 11.

It will be understood that the wheel mounted on the axle stud carries the crank arm 11 and said arm supports the yoke 5 which in turn carries the frame of the vehicle through the king pin connection. The crank arm and its attached arm 25 supports the king pin connection in its proper relation through the medium of the spring 29 and the relative movement of the arm 11 is checked by the shock absorber.

The structure thus described is a compact unit which may be bench assembled and may be bolted or riveted on the vehicle frame, or the bracket 1 may be secured on the frame and the remaining part of the unit assembled thereon by the placing of the king bolt. Such a construction will provide individual wheel supports of a unique but extremely simple and rugged nature.

It will be understood that the spring support between the crank arm and the yoke member may be altered and flat or leaf springs may be used, and also that many details of the device may be varied without departing from the principal features of the invention.

What I claim as my invention is:—

1. A wheel support for motor vehicles, comprising a member pivoted to swing laterally on the vehicle frame, an arm mounted on the wheel axle and having a threaded oscillating bearing in said laterally swingable member to swing vertically, said threaded bearing presenting an extensive end thrust bearing area to restrict end play between said arm and swingable member, and spring means interposed between the laterally swingable member and the vertically swinging arm to limit the swinging movement of the latter arm.

2. In a wheel support for motor vehicles, the combination with the wheel and vehicle frame, of a king pin mounted on the frame, a member mounted on said king pin to swing laterally and having a threaded orifice, a crank arm disposed on the outward side of said member having one end threaded and engaging the threaded orifice in oscillative threaded bearing contact and carrying a wheel axle parallel to the threaded bearing axis, and a spring mounted on the inward side of said laterally swingable member and coupled with said crank arm to limit its vertical movement.

3. In a wheel support for motor vehicles, the combination with the wheel and vehicle frame, of a king pin mounted on the frame, a C-shaped yoke member having its free ends extending in the forward direction of the vehicle and mounted to rotate on the axis of said king pin, an arm arranged alongside said yoke on the outward side thereof and having a crank end journalled transversely in the connecting base portion of said yoke, a wheel axle mounted on said arm, and a spring mounted on the inward side of said yoke and resisting the upward swinging movement of said arm about its journal pivot.

4. In a wheel support for motor vehicles, the combination with the wheel and vehicle frame, of a bracket rigidly secured to said frame and having a king pin, a C-shaped yoke journalled to swing laterally on said king pin and having a transverse journal bearing therein in the base portion, a member journalled in said bearing and having a crank extension on the outward side of said yoke, an axle extending from said crank extension and supported in said wheel, a spring mounted on the inward side of said yoke and rigidly secured at one end to said yoke and arranged in a plane substantially parallel with the plane of movement of said crank arm, and means extending from said journalled member on the inward side of said yoke and engaging the free end of said spring to cushion movement of said arm.

5. In a wheel support for motor vehicles, the combination with a wheel and vehicle frame, of a bracket mounted on the frame and carrying a king pin, a yoke-shaped member having the ends thereof supported on the king pin and having a boss extending laterally, a threaded journal orifice extending through the bossed portion of said yoke member, a crank arm having an angularly disposed wheel axle, said arm having an angularly disposed threaded crank end journalled in the threaded bearing in said yoke, a spring secured at one end to said yoke, and an arm adjustably related to said arm and swinging therewith and engaging the free end of said spring.

6. In a wheel support for motor vehicles, the combination with the wheel and vehicle frame, of a bracket mounted on the frame and carrying a king pin, a yoke-shaped member having the ends thereof supported on the king pin and having a boss extending laterally therefrom, a threaded journal orifice extending through the bossed portion of said yoke member, a crank arm having a laterally disposed wheel axle, said arm having a laterally disposed threaded end journalled in the threaded bearing in said yoke, a spiral spring encircling said boss and having its inner end secured thereto, and an arm adjustably related to and swinging with said crank arm and engaging the free end of said spring.

7. In a wheel support for motor vehicles, the combination with a frame, a king pin mounted on the frame, a member pivotally supported by the king pin and having a transverse threaded bearing orifice, a crank arm having a threaded portion engaging said threaded orifice and a wheel axle, the threaded portion of said crank arm having a tapered extension and a threaded extremity, an arm having a tapered orifice engaging the tapered extension of said crank arm and having a laterally turned end, a nut threaded on said threaded extermity and securing said arm, and a spring rigidly mounted on the member pivoted on the king pin and having its free end engaged by the turned end of the arm mounted on the tapered extension.

8. A wheel support for motor vehicles comprising in combination a frame, a king pin mounted on the frame, a member swivelly mounted on the king pin and extending in one direction therefrom, a wheel supporting arm oscillatably mounted in the outer end of said member and extending in the opposite direction toward and beyond the king pin in the form of a lever extension, a shock absorber unit mounted on said swivelly mounted member above the king pin and having an oscillating arm extending in substantially the same direction as the said arm and substantially parallel thereto and terminating substantially directly above the free end of said arm extension, and an operating connection connecting the free ends of said arm extension with the free end of the shock absorber arm, whereby said entire assembly swings as a unit about the king pin axis.

JOHN WYCLIFFE LEIGHTON.